United States Patent [19]
Eckel et al.

[11] Patent Number: 4,813,909
[45] Date of Patent: Mar. 21, 1989

[54] ELASTIC AXIAL-ROTATION COUPLER

[75] Inventors: Hans G. Eckel, Hirschberg; Benno Jörg, Weinheim, both of Fed. Rep. of Germany

[73] Assignee: Firma Carl Freudenberg, Weinheim, Fed. Rep. of Germany

[21] Appl. No.: 117,047

[22] Filed: Dec. 28, 1987

Related U.S. Application Data

[62] Division of Ser. No. 891,650, Jul. 29, 1986, Pat. No. 4,728,314.

[30] Foreign Application Priority Data

Aug. 3, 1985 [DE] Fed. Rep. of Germany ....... 3527990

[51] Int. Cl.$^4$ ............................................. F16D 3/80
[52] U.S. Cl. ........................................ 464/90; 403/34; 464/87
[58] Field of Search ................ 192/58 A, 58 B, 106.1; 403/34, 220; 464/24, 28, 87, 89, 90, 91, 92, 96, 99

[56] References Cited

U.S. PATENT DOCUMENTS

| | | | |
|---|---|---|---|
| 1,445,272 | 2/1923 | Gill | 464/99 X |
| 2,919,563 | 1/1960 | Grant | 464/28 X |
| 4,351,167 | 9/1982 | Hanke et al. | 464/24 |
| 4,389,204 | 6/1983 | Walter | 464/91 |

*Primary Examiner*—Daniel P. Stodola
*Attorney, Agent, or Firm*—Felfe & Lynch

[57] ABSTRACT

An elastic axial-rotation coupler has two inelastic devices for respective, inelastic connection to the two axially-rotatable structures, one of the devices defining an annular chamber therein. The annular chamber is closed axially and radially outwardly by the inelastic device defining it. At least one resilient element is in the annular chamber and connected to each device for rotatably coupling them resiliently and, thereby, so coupling the axially-rotatable structures which can be connected to the devices. The resilient element preferably is a rubber-elastic body. At least when the structures axially rotate the devices, a liquid is also in the annular chamber for impinging on the resilient element where the centrifugal force of its rotation with the devices would distort it. The liquid preferably has substantially the same density as the resilient element.

15 Claims, 2 Drawing Sheets

ELASTIC AXIAL-ROTATION COUPLER

CROSS REFERENCE TO RELATED APPLICATION

This application is a division of application Ser. No. 891,650 filed July 29, 1986 for "Elastic Axial-Rotation Coupler", now U.S. Pat. No. 4,728,314.

BACKGROUND OF THE INVENTION

The invention relates to an elastic axial-rotation coupler such as a coupler for resiliently coupling facing ends of axially-successive, coaxial, rotatable shafts, for example, and, more particularly a coupler having liquid in a chamber about a resilient element of the coupler.

A shaft coupler of this type is known from French Pat. No. 2,268,186. Its resilient element serves both to transmit the rotary motion and to seal an annular chamber in which a liquid is confined. It thus has dual functions and this can pose serious problems, especially in coupling high rotational speeds of the shaft.

These problems are due, mainly, to deformation of the resilient element by centrifugal force. At high shaft speeds, such deformation can alter the spring behavior of the resilient element significantly. Using a shaft coupler according to French Pat. No. 2,268,186 in cases where high shaft speeds are likely is, therefore, extremely problematic.

SUMMARY OF THE INVENTION

An object of the invention is, therefore, to improve an elastic shaft coupler of the type described above in such way that deformation of its resilient element by centrifugal force is reduced or eliminated.

To this and other ends, the invention provides a coupler for coupling one axially-rotatable structure such as a shaft, for example, to another elastically i.e., in a way allowing limited relative movement between the structures. The elastic axial-rotation coupler has two, inelastic devices for respective, inelastic connection to the two axially-rotatable structures, one of the devices defining an annular chamber therein. The annular chamber may be open radially inwardly, but is closed axially in both directions and radially outwardly by the inelastic device defining it. At least one resilient element is in the annular chamber and connected to the chamber to each device for rotatably coupling them resiliently and, thereby, so coupling the axially-rotatable structures which can be connected to the devices. The resilient element preferably is a rubber-elastic body. At least when the structures axially rotate the devices, a liquid is also in the annular chamber for supporting the resilient element where the centrifugal force of its rotation with the devices would distort it. As a result of centrifugal forces, the liquid distributes itself ringform-like in the chamber and its amount is determined so that starting from the radial outward boundary wall of the chamber, each free space thereof is filled with liquid until it reaches partially over the resilient element in the inward direction. It is, in case of rotation of the chamber submitted to the occuring centrifugal forces just like the resilient element which results in preventing, when adjusted properly, a shift of the liquid constituent through centrifugal force-caused deformations of the resilient element. This adjustment is relatively simple and has, beside the selection of the proper amount of liquid which determines the radial extension of the ring formed in rotation of the coupling, the selection of a liquid with a suitable density. Only these parameters have an influence on the size of the centrifugal forces within the liquid during rotation. In the coupler according to the invention, they thus equalize the centrifugal forces which could lead to deformations of the resilient element. Thus, the resilient element is, in case of rotating coupler according to the invention, completely independent from the respective speed of rotation, only loaded by the torque and the forces which have to be transmitted from the relative rotation of the device. The liquid preferably has substantially the same density as the resilient element, which facilitates obtaining the correct support. In case of complete conformity of the density of the resilient element with that of the liquid, when the liquid in rotating arrangement reaches the radially inward level of the resilient element correct support is assured.

In one preferred embodiment, the resilient element extends between axially-opposed holding surfaces substantially axially with respect to the axial rotation of the devices it couples. The centrifugal force of its rotation with the devices would, therefore, distort it radially outwardly. The liquid therefore supports the radially outward surfaces of the resilient element and reaches, at least partially, in case of the rotating arrangement, over the resilient element in the radial direction, whereby the relatively rotatable device is correspondingly flooded. A possible reaching over the radial inside of the resilient element may be of advantage.

In another preferred embodiment, the resilient element extends radially-opposed holding surfaces substantially radially from the axis of rotation of the devices it couples and is a rubber elastic body.

Rubber-elastic material is generally incompressible, like a liquid. The centrifugal force of rotation of the generallyradial rubber-elastic-body resilient element therefore acts radially, but cannot press the rubber-elastic body against the radially-outermore, inelastic device it couples. As a result, the pressure of the centrifugal force would, therefore, distort it axially. The liquid therefore supports the axial surfaces of the resilient element. Both free spaces of the chamber which are here adjacent are suitably connected by a bore penetrating through the resilient element in the range of the outer circumference, through which the liquid can stream to and fro in order to automatically equalize eventual differences of the amounts contained on both sides.

The centrifugal force of rotation also acts on the liquid also in the annular chamber of the one of the devices. The resulting pressure of the liquid thus presses the surface of the resilient element it impinges oppositely to the direction the centrifugal force would distort the resilient element. This reduces the centrifugal distortion of the resilient element.

Indeed, design of the annular chamber and resilient element and the selection of the volume of liquid therein to provide an appropriate depth of the liquid radially inward from the surface of the resilient element the liquid impinges, relative to the relative densities of the resilient element and liquid, can balance the centrifugal and liquid-pressure forces so that the resilient element is not centrifugally distorted. This is easily achieved if the resilient element and liquid have substantially the same densities and the liquid has, during rotation, the same radial extension as the resilient element.

One preferred coupler of the invention is thus characterized by its resilient element being in an annular chamber that is inelastically bounded outwardly, filled with an effective amount of a liquid which has substantially the same density as the resilient element. The resilient element like the liquid, is a substance that is readily deformable but not compressible. Because the liquid in the annular chamber is between the resilient element and the nonresilient device defining the annular chamber, excellent support is provided for the resilient element with a view of preventing changes in its shape due to centrifugal force. The shape of the resilient element can therefore be optimized solely for meeting the specific requirements transmitting rotary motion, that shape being retained even at maximum rotary speeds. Vibrations between the structures coupled by the coupler can then be isolated much better than has been held possible up to now, and the selection of the material for the resilient element is greatly simplified.

The centrifugal-origin forces which would deform the resilient element can be compensated most readily by using a liquid that has the same density as the resilient element. For many rubber-elastic resilient elements, such liquids are known and include water, silicone-oil and glycol. Merely filling the available free space of the annular chamber of the coupler up to the radially inner boundary surface of the resilient element will then lead to the desired result in some designs.

In cases where the density of the resilient element is different (greater or less) than that of the liquid, a similar result can be obtained through appropriately greater or less filling of the annular chamber with the liquid for hydrostatic adjustment upon rotation or dimensioning of the surface of the resilient element impinged by the liquid for hydrostatic adjustment. These adjustments can be calculated precisely or determined empirically. In most cases, it will not be necessary to go to great lengths with calculations because empirical knowledge will suggest the answer.

The annular chamber containing the liquid is bounded in the outward radial direction and on both sides in the axial direction in a liquid-tight manner. Because the liquid confined in it is distributed annularly while the coupler is rotating, the annular chamber requires no seal radially inwardly if there is another way of assuring that the liquid cannot escape when the coupler is at rest.

However, a seal may be used between the two devices radially inward of the annular chamber and should be used when that condition cannot be met or when it is likely that, during the normal operation of the coupler, foreign matter will enter the annular chamber. The use of a dynamic seal radially inward of the annular chamber, in particular, has proved highly satisfactory. A dynamic seal could also be located in other zones of the coupler, but allowance must be made for the pressure of the liquid from centrifugal force upon rotation. A seal about the inside circumference of the annular chamber of the coupler is, therefore, preferred.

The specific disposition of the resilient element relative to the two devices may conform to known models or ideas. Thus, for example, the axial arrangement of the preferred embodiment first described above permits the transmission of high torques despite a small diameter; whereas, the radial arrangement of the preferred embodiment second described above combines very soft spring characteristics with small axial length. Each of these two basic designs thus has specific advantages.

Where necessary, the advantages can be combined by a parallel or series arrangement of differently-arranged resilient elements. The essential scope of the present invention is not affected by this.

In cases where the liquid impinges on opposite sides of the resilient element, it is preferable to interconnect the liquid-filled spaces with channels or passages. These should be in the proximity of the outer periphery of the resilient element and/or the device defining the annular chamber in order to equalize the pressure distribution resulting from rotation. Even a temperature rise on one side of the resilient element will then have no adverse effect on the operating behavior of the coupler. The channels or passages are especially important in embodiments where the resilient element extends generally radially between radially-spaced holding surfaces of the devices.

Plural resilient-element parts forming, together, a composite resilient element may also be used. The resilientelement parts may be uniformly distributed circumferentially about the coupler. When surfaces of the resilient element opposing each other are submitted to pressure of the liquid caused by centrifugal forces, and the liquid has the same density as the resilient element, no imbalance forces will result, even when the parts forming the resilient element are not distributed uniformly.

If desired, the resilient element can be formed by one single resilient body instead of the circumferentially arranged resilient elements.

This body is able to connect the parts which have to be united in an axial and/or radial direction, accordingly also in a direction being diagonal to the axis of the coupler. Normally, however, with a view to avoiding imbalance at high rotary speeds, it is preferable to form the resilient element with rotational symmetry concentric of the axis of rotation of the coupler, i.e., as a ring. Plural resilient-element rings may also be used. The ring design will also greatly simplify both manufacture and installation.

BRIEF DESCRIPTION OF THE DRAWINGS

Preferred embodiments which illustrate but do not limit the invention will now be described in greater detail with reference to the accompanying drawings, wherein.

DESCRIPTION OF THE PREFERRED EMBODIMENTS

Figure 1:
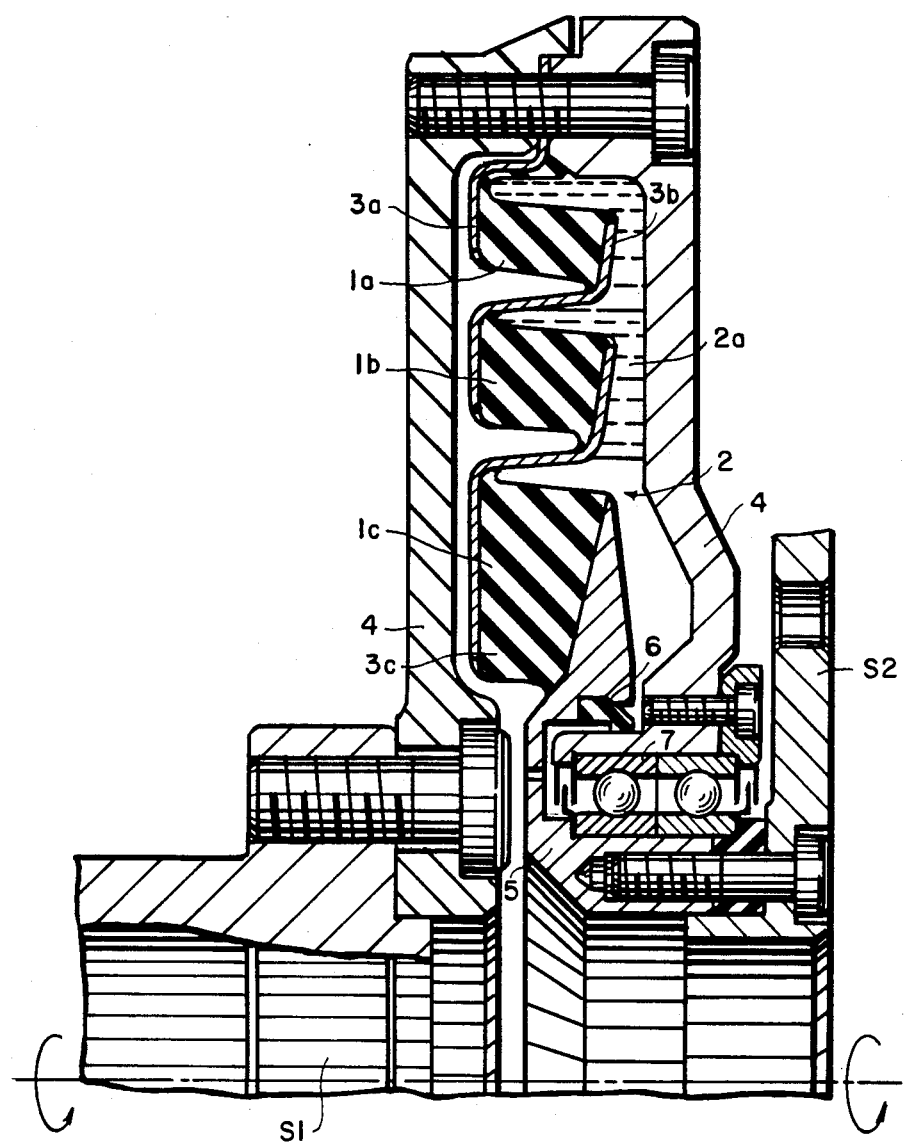
FIG. 1 is a cross-section of half an axial elevation of a first preferred embodiment of the coupler according to the invention, together with axially-rotatable structures it couples, partly in section.

The preferred coupler embodiment shown in FIG. 1 has two devices, namely, composite flange 4 and flange 5, for respective connection to opposed ends of a coaxial, axially-rotatable shaft 51 and a structure 52 to be elastically coupled thereby. The two flanges are supported on each other for relative rotation by a ball bearing 7. Composite flange 4 defines an annular chamber which is substantially rectangular in cross section and coaxial with the axis of rotation.

The composite portions of the composite flange 4 radially outermost of the annular chamber 2 hold one leg of a ring 3a which is Z shaped in cross section radially and has another leg projecting radially into the annular chamber. One axial end of a rubber-elastic resilient-element ring 1a is connected to the latter radially-projecting leg. The other axial end of the resilient-element ring 1a is connected to an axially-opposed radially-extending leg of another Z-shaped ring 3b that also has another leg projecting radially in the chamber.

The latter, other leg is connected to an axial end of another rubber-elastic resilient-element ring 1b and, like resilient-element ring 1a, the other axial end of resilient-element ring 1b is connected to one, axially-opposed radial leg of still another Z-shaped ring 3c. The other radial leg of ring 3c is connected to one axial end of still another rubber-elastic resilient-element ring 1c.

The other axial end of the resilient-element ring 2c is connected to an axially-opposed holding surface the flange 5. The result is, therefore, concentric rings of a three-part, composite resilient element. It acts as a series arrangement of its three parts and these are coordinated with respect to their cross sections, hardnesses and densities in such a way that optimal torsional isolation of the anticipated spectrum of vibrations between the coupled structures 51, 52 is obtained.

The coordination of the cross sections and hardnesses of the resilient-element rings for this purpose will be understood in the art. With respect to the coordination of their densities, the composite resilient element, as described, also generally-radially subdivides the annular chamber into axially-separated portions. The portion of the annular chamber having the radially outermost side of each resilient-element ring 1a, 1b, 1c is partly filled with a liquid 2a. The liquid is a mixture of glycol and water having substantially the same density as the rubber-elastic of the middle resilient-element ring 1b and a lower deposity than the rubber-elastic of the outermost resilient-element ring 1a. The volume of the liquid in this annular chamber is, then, such that, when the structures rotate the coupler, the radially-outer portion of the annular chamber is filled with the liquid to the radially-inner side of the middle resilient-element ring 1b, as shown in FIG. 1.

Alternatively, the annular chamber could be filled with the liquid to the radially-inner side of the inner resilient element ring 1c, as shown in dashed lines 10 in FIG. 1.

With an outside diameter of the coupler of 35 cm, good operating behavior has been obtained up to a rotational speed of 5000 rpm. That is, up to that rotational speed, there is no unwanted deformation of the outer two resilient-element rings 1a, 1b because of the counter-pressure of the liquid.

The inner resilient-element ring 1c is not objectionably distorted at such a rotational speed, either, because it is radially innermost and experiences less centrifugal force. If necessary, it may also be made of a harder rubber-elastic than the other resilient-element rings. It, therefore, does not need additional liquid-pressure support.

When the structures S1, S2 rotate the coupler too slowly to support the liquid 2a centrifugally about the radially-outermost part of the liquid-containing portion of the annular chamber 2 as shown in FIG. 1, or stop, the liquid will, of course, drain to the lowest part of the annular chamber (not shown in the orientation of FIG. 1) by the force of gravity. If the volume of the liquid is such that it then fills the lowest part of the liquid-containing portion of the annular chamber to its radially innermost point, the liquid could then drain out through the ball bearing 7. To prevent this, a dynamic, sliding-lip seal 6 extends between the flanges 4, 5 about the radially-innermost end of the annular chamber at 2.

Figure 2:
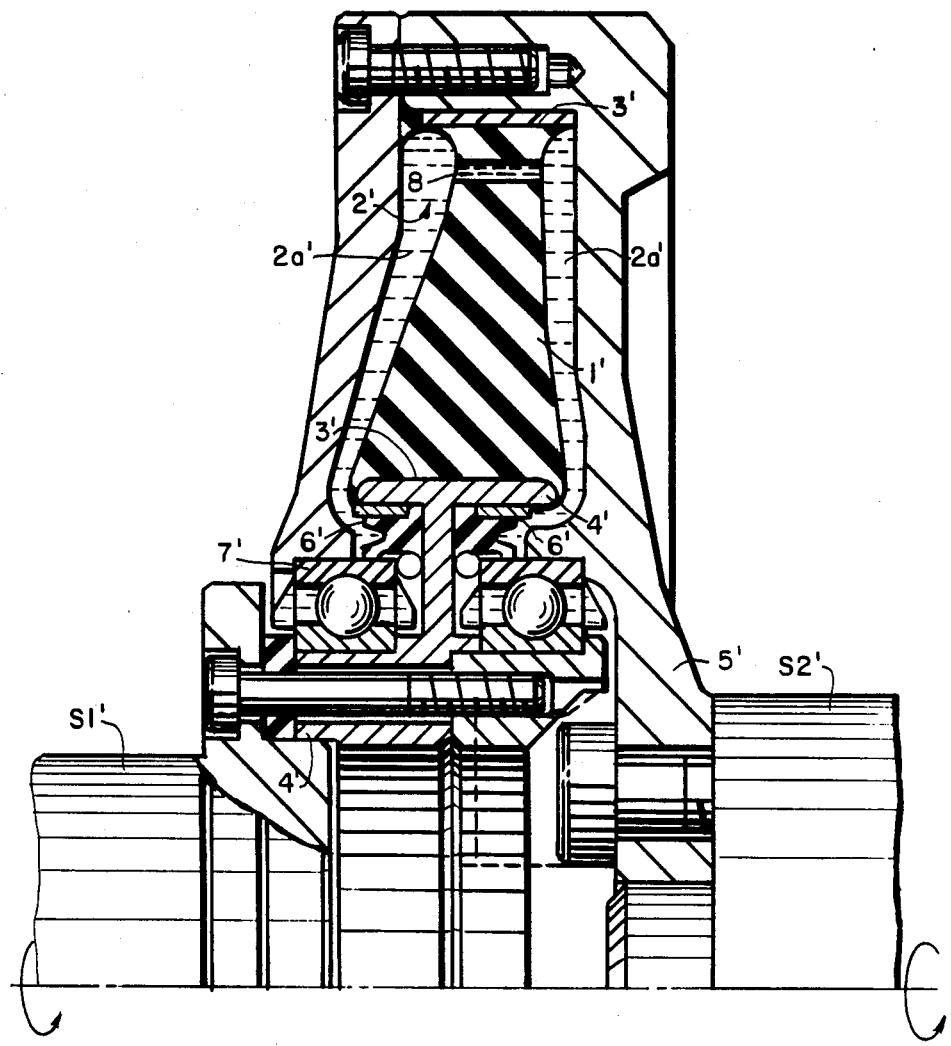
FIG. 2 is a cross section of half an axial elevation of a second preferred embodiment of the coupler according to the invention together with the axially-rotatable structures it couples, partly in section.

In the embodiment shown in FIG. 2, there is only one, unitary rubber-elastic resilient-element ring 1'. It is annular and coaxial of the axis of flanges 4', 5' for connecting the coupler to axially-successive, coaxial, axially-rotatable structures S1', S2', the flanges being supported on each other by ball bearing 7, as in the embodiment of FIG. 1. In further contrast to the embodiment of FIG. 1, however, in the embodiment of FIG. 2, the flange 5' is composite and the flange 4' is not, the composite flange 5' also defining the annular chamber at 2'. Further, the resilient element 1' unites, not axially-opposed holding surfaces of flange-connected, Z-shaped members, but radially-opposed, axial holding surfaces 3' of each of the flanges 4', 5' themselves.

The resilient element 1' therefore axially separates opposite side portions of the annular chamber and each of these is completely filled with the liquid 2a'. The radially-innermost end of each of the side portions of the annular chamber is sealed with a dynamic, lipped seal 6' as is desirable in this embodiment, even while it is rotation, because of the liquid-filled annular chamber portions. As before, the liquid is a mixture of glycol and water to have substantially the same density as the rubber elastic of the resilient element.

If some of the liquid should drain out of one of the opposite side portions of the annular chamber but not the other, however, or if one of these but not the other should be heated, a pressure differential could develop across the resilient element 1' which could deform it and affect its resilience. This is, of course, as undesirable as centrifugal distortion of the resilient element. To prevent this, therefore, there is at least one passage 8 through the resilient element from one liquid-filled side portion of the annular chamber to the other. The passage allows any pressure differential across the resilient element to equalize, regardless of the speed of rotation of the coupler. The passage is near the radially outer periphery of the resilient element so as to remain effective even if the annular chamber should become less than full of the liquid.

Upon rotation of either preferred embodiment in operation, centrifugal force on the resilient element is balanced by the pressure the centrifugal force produces in the liquid. This is the result of the similar radial depth of the liquid and resilient element, at least when the embodiments are rotating, and their similar densities. The load on the resilient element is, therefore, greatly reduced in comparison with conventional couplers, so that optimizing the design of the resilient element for isolating torsional vibrations between the structures coupled with the coupler is greatly simplified.

It will be appreciated that the instant specification and claims are set for the by way of illustration and not of limitation, and that various changes and modifications may be made without departing from the spirit and scope of the present invention.

What is claimed is:

1. An elastic axial-rotation coupler, comprising:
   two inelastic devices for respective, inelastic connection to two axially rotatable structures, at least one of the devices defining an inelastic annular chamber therein which is closed axially in both directions and radially outwardly;

at least one elastic coupling element and a liquid in the annular chamber, the elastic coupling element connected in the chamber to each device for rotatably coupling them in a resilient manner, thereby so coupling the axially rotatable structures, said elastic coupling element being surrounded, on axially opposite sides and radially outwardly, by said annular chamber, said elastic coupling element comprising a series of substantially radially extending rings successively connected together in the axial direction by at least one elastomeric element, wherein said liquid, at least when the structures rotate, is distributed radially outwardly in the chamber, said liquid filling a radial outward boundary of the chamber where a free space exists between said elastic coupling element and at least one of said inelastic devices to a location radially toward the axis of rotation in which the elastic coupling element is at least partially covered on one side.

2. The elastic axial-rotation coupler of claim 1, wherein said elastomeric elements and the liquid have substantially the same densities.

3. The elastic axial-rotation coupler of claim 2, and further comprising a dynamic, lipped seal between the devices radially innermost of the annular chamber.

4. The elastic axial-rotation coupler of claim 2, wherein said elastic coupling element is connected to each device between radially-opposed holding surfaces.

5. The elastic axial-rotation coupler of claim 4 wherein said elastic coupling element is a ring concentric of the axis of rotation of the coupler.

6. The elastic axial-rotation coupler of claim 5 and further comprising a dynamic, lipped seal between the devices radially innermost of the annular chamber.

7. The elastic axial-rotation coupler of claim 4 and further comprising a dynamic, lipped seal between the devices radially innermost of the annular chamber.

8. The elastic axial-rotation coupler of claim 2, wherein said elastic coupling element is a ring concentric of the axis of rotation of the coupler.

9. The elastic axial-rotation coupler of claim 8, and further comprising a dynamic, lipped seal between the devices radially innermost of the annular chamber.

10. The elastic axial-rotation coupler of claim 1, wherein said elastic coupling element is connected to each device between radially-opposed holding surfaces, whereby there are free spaces of said annular chamber in the axial direction of both sides of said elastic coupling element.

11. The elastic axial-rotation coupler of claim 10, wherein said elastic coupling element is a ring concentric of the axis of rotation of the coupler.

12. The elastic axial-rotation coupler of claim 1, wherein said elastic coupling element is a ring concentric of the axis of rotation of the coupler.

13. The elastic axial-rotation coupler of claim 12, and further comprising a dynamic, lipped seal between the devices radially innermost of the annular chamber.

14. The elastic axial-rotation coupler of claim 1, and further comprising a dynamic, lipped seal between the devices radially innermost of the annular chamber.

15. The elastic axial-rotation coupler of claim 1 wherein said liquid, starting from the radial outward boundary wall of the chamber, fills each free space between the elastic coupling element and the one inelastic device and reaches in the radial direction of the axis of rotation so far that the elastic coupling element is completely covered.

* * * * *